United States Patent

Cho

[11] Patent Number: 5,859,752
[45] Date of Patent: Jan. 12, 1999

[54] HEAD DRUM ASSEMBLY OF A VIDEO CASSETTE RECORDER

[75] Inventor: Bu-Hyun Cho, Seoul, Rep. of Korea

[73] Assignee: Daewoo Electronics Co., Ltd., Rep. of Korea

[21] Appl. No.: 921,088

[22] Filed: Aug. 29, 1997

[30] Foreign Application Priority Data

Aug. 31, 1996 [KR] Rep. of Korea ............... 1996-37657

[51] Int. Cl.⁶ .................................................. G11B 5/52
[52] U.S. Cl. .................................................. 360/107
[58] Field of Search .................................. 360/107

[56] References Cited

U.S. PATENT DOCUMENTS

| | | |
|---|---|---|
| 4,400,751 | 8/1983 | Tominaga . |
| 4,564,876 | 1/1986 | Takahashi . |
| 5,010,432 | 4/1991 | Fukushima et al. .......... 360/107 X |
| 5,392,507 | 2/1995 | Juncker et al. .............. 360/107 X |
| 5,432,658 | 7/1995 | Kajita et al. ................ 360/107 X |
| 5,463,506 | 10/1995 | Mitsuyasu et al. .......... 360/107 X |
| 5,581,426 | 12/1996 | Kim ............................. 360/109 |
| 5,694,273 | 12/1997 | Takeuchi .................... 360/107 |

FOREIGN PATENT DOCUMENTS

| | | |
|---|---|---|
| 0 257 761 | 3/1988 | European Pat. Off. . |
| 0 463 750 | 1/1992 | European Pat. Off. . |
| 59-036361 | 2/1984 | Japan . |
| 2 308 721 | 7/1997 | United Kingdom . |

Primary Examiner—John H. Wolff
Attorney, Agent, or Firm—Pillsbury Madison & Sutro, LLP

[57] ABSTRACT

Disclosed is a head drum assembly of the video cassette recorder providing a lower drum, a motor which is mounted at the lower drum, ant upper drum rotating by the motor, a rotary transformer which is installed between the lower drum and the upper drum, and a plurality of head bases having one or more heads for reproducing the video signals from a magnetic tap and being integrally formed with the rotary transformer. The head bases and the rotary transformer are formed as one body by an insert molding. Advantages of the present invention are that assembling of the head assembly is easy, productivity is increased, and the manufacturing cost thereof is reduced.

5 Claims, 5 Drawing Sheets

5,859,752

HEAD DRUM ASSEMBLY OF A VIDEO CASSETTE RECORDER

BACKGROUND OF THE INVENTION

1. Field of the Invention

The present invention relates to a video cassette recorder (hereinafter, referred to as "VCR"), and more particularly to a head cassette assembly for a video cassette recorder.

2. Description of the Prior Art

Generally, a video cassette recorder is an apparatus for recording image and audio signs onto a magnetic tape and for reproducing the signals from the magnetic tape on which the signals are recorded. The video cassette reorder is provided with a main base, a driving system mounted on the main base for drawing the tape from a cartridge and for running the tape around the outer surface of the head drum accord to a predetermined route, and a head drum assembly for recording the video signals onto the tape and for reproducing the video signals from the tape on which the signals are recorded.

The head drum assembly includes an upper drum having a head for recording the video signals on the tape and for reproducing the video signals from the tape on which the video signals is recorded, and a lower drum which is positioned below the upper drum and is provided with a motor for rotating the upper drum. While the upper drum is rotated by the motor, the head records the video signals onto the tape and reproduces the video signals from the tape on which the video signals are recorded.

Generally, a rotary transformer for transmitting the video signals which are recorded/reproduced onto/from the tape to art external device is arranged in the lower drum. U.S. Pat. No. 5,581,426 (issued to Keum-Mo Kim on Dec. 3, 1996, entitled "Upper Head Drum Assembly including at least one Nut Cap" and assigned to the assignee of the present application) discloses one example of a head drum assembly.

FIG. 1 illustrates a conventional head drum assembly 100 which is similar to the head drum assembly disclosed in the above U.S. patent. As illustrated in the figure, the head drum assembly 100 is provided with a lower dram 120 fixed on the main base (not shown) and an upper drum 110 mounted on the lower drum 120. The upper drum 110 has head bases 112 at a lower surface thereof, and each of the head bases 112 has a magnetic head 114 on an upper surface thereof. At the lower surface of the lower drum 120, a motor 130 for generating the rotational force is installed, and a shaft 140 which transmits the rotational force of the motor 130 to the upper drum 110 is rotatably inserted into the upper dram 110 and the lower drum 120. A rotary transformer 122 is installed between the upper drum 110 and the lower drum 120. The rotary transformer 122 is provided with a rotor 122a which is connected to the upper drum 110 and is rotated together with the upper drum 110, and a stator 122b which is fixed on an upper portion of the lower drum 120.

The upper drum 110 is fixed by joining screws 111 at a plange 117 which is provided at the shaft 140. The upper drum 110 has second screw holes 116b for controlling the level of the head base's height, and has first screw holes 118b which penetrate from an outer surface to a lower surface of the upper drum 110 for joining the head bases 112 with the upper drum 110. The head bases 112 and the rotary transformer 122 are spaced apart from each other.

The plurality of the head bases 112 are fixed at the lower surface of the upper drum 110 by screwing the joining screws 118a into first screw holes 118b, and each of the heads 114 is attached to the upper surface of each of the head bases 112. The heads 114 record the video signals onto the tape and reproduce the video signals from the tape on which the video signals are recorded while the magnetic head are rotated together with the upper drum 110. The magnetic beads 114 are arranged at the upper drum 110 by a regular interval, desirably 180°, for recording and reproducing the video signals onto and from the track formed on the tape. The heights of the heads 114 are controlled by fixing screws 116a and the fixing screws 116a are inserted through the second holes 116b of the upper drum 110. The rotary transformer 122 transmits the video signals from the head 114 to an external device and/or from the external device to the head 114. The rotor 122a of the rotary transformer 122 is electrically connected to the head 114 by an electric wire 115.

The video signals reproduced by the heads 114 are transmitted to the external device via the stator 122b of the rotary transformer 122 from the rotor 122a of the rotary transformer 122 by an induction between the rotor 122a of the rotary transformer 122 and the stator 122b of the rotary transformer 122. Alternatively, the rotary transformer 122 transmits the video signals which are transmitted from the external device to the head 114 via the rotor 122a of the rotary transformer 122 from the stator 122b of the rotary transformer 122 by an induction between the rotor 122a of the rotary transformer 122 and tie stator 122b of the rotary transformer 122.

Accordingly, the heads 114 are electrically connected with an external device, for example an amplifier etc, while the heads 114 rotate together with the upper drum 110. However, in the conventional head drum assembly, each of head bases 112 has to be fixed to the upper drum 110, and thus the height of each of the treads 114 should be controlled independently. Therefore, as the number of the heads 114 increases, the time required for controlling the heights of the head bases 112 and for fixing the head bases 112 to the upper drum also increases. In addition, if the number of heads 114 increase, the cost of producing the head drum assembly also increases.

SUMMARY OF THE INVENTION

Accordingly, the present invention is contrived to solve the foregoing problems, so it is an object of the present invention to provide a head drum assembly of the video cassette recorder capable of decreasing the production cost thereof and of simplifying an assembly of a head base thereof.

In order to achieve the above object, the present invention provides a head drum assembly of the video cassette recorder comprising;

a lower drum;

an upper drum which is rotatably placed on the lower drum;

a motor for generating a rotational force to rotate the upper drum and having a stator which is mounted at a lower surface of the lower drum, and a rotating rotor which is spaced apart from the stator by a predetermined interval and is rotated by a reciprocal action with the stator;

a shaft for rotating the upper drum by transmitting the rotational force of the motor to the upper drum;

a plurality of magnetic heads for recording/reproducing the video signals onto/from the magnetic tape while the magnetic heads are rotated together with the upper drum;

a rotary transformer having a rotary transformer rotor which is electrically connected to the heads and is fixed at a lower surface of the upper drum, and a rotary transformer stator which is fixed to an upper surface of the lower drum, for electrically connecting the heads to an external device by a reciprocal action between the rotary transformer stator and the rotary transformer rotor; and a head base part including a plurality of head bases which are arranged at a predetermined intervals for fixing the magnetic heads, and a connecting piece for connecting the head bases together and for connecting the head bases to the rotary transformer.

According to the present invention, the rotary transformer rotor and the head bases part are integrally formed, and the head bases are comprised of a synthetic resin.

The rotary transformer rotor has connecting grooves which are separated by a predetermined angle from each other and are formed on the outer circumferencial surface of the rotary transformer rotor, and the connecting piece has a plurality of connecting projections which are separated by the predetermined angle from each other and are formed on an inner circumferencial surface of the connecting piece. The rotary transformer rotor and the head bases part are integrally formed by means of an insert mould.

The head drum assembly of the video cassette recorder of the present invention has the advantages that the assembly thereof is easy, productivity is increased, and a manufacturing cost thereof is decreased,

BRIEF DESCRIPTION OF THE DRAWINGS

Other object and advantages of the present invention will become more apparent by describing in detail preferred embodiments thereof with reference to the attached drawings, in which.

DESCRIPTION OF THE PREFERRED EMBODIMENTS

Hereinafter, the preferred embodiments of the present invention will be explained in more detail with reference to the accompanying drawings.

Embodiment 1

Figure 1:
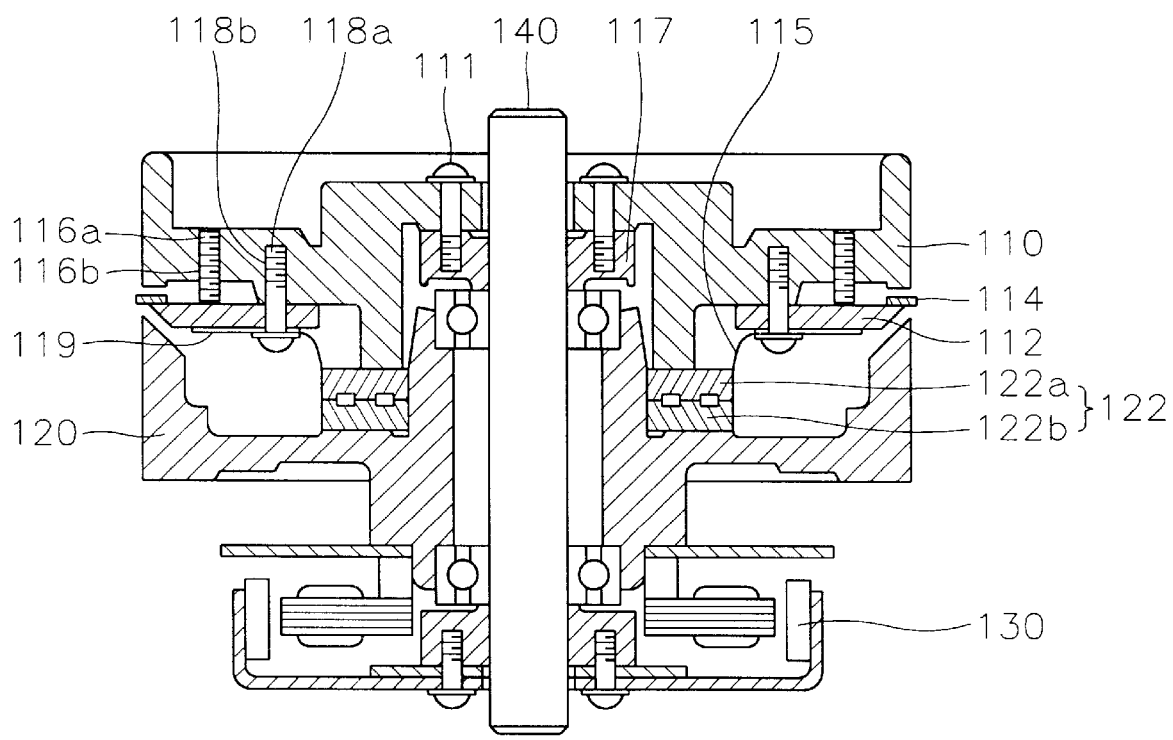
FIG. 1 is a cross-sectional view for showing a head drum assembly of a conventional video cassette recorder.
Figure 2:
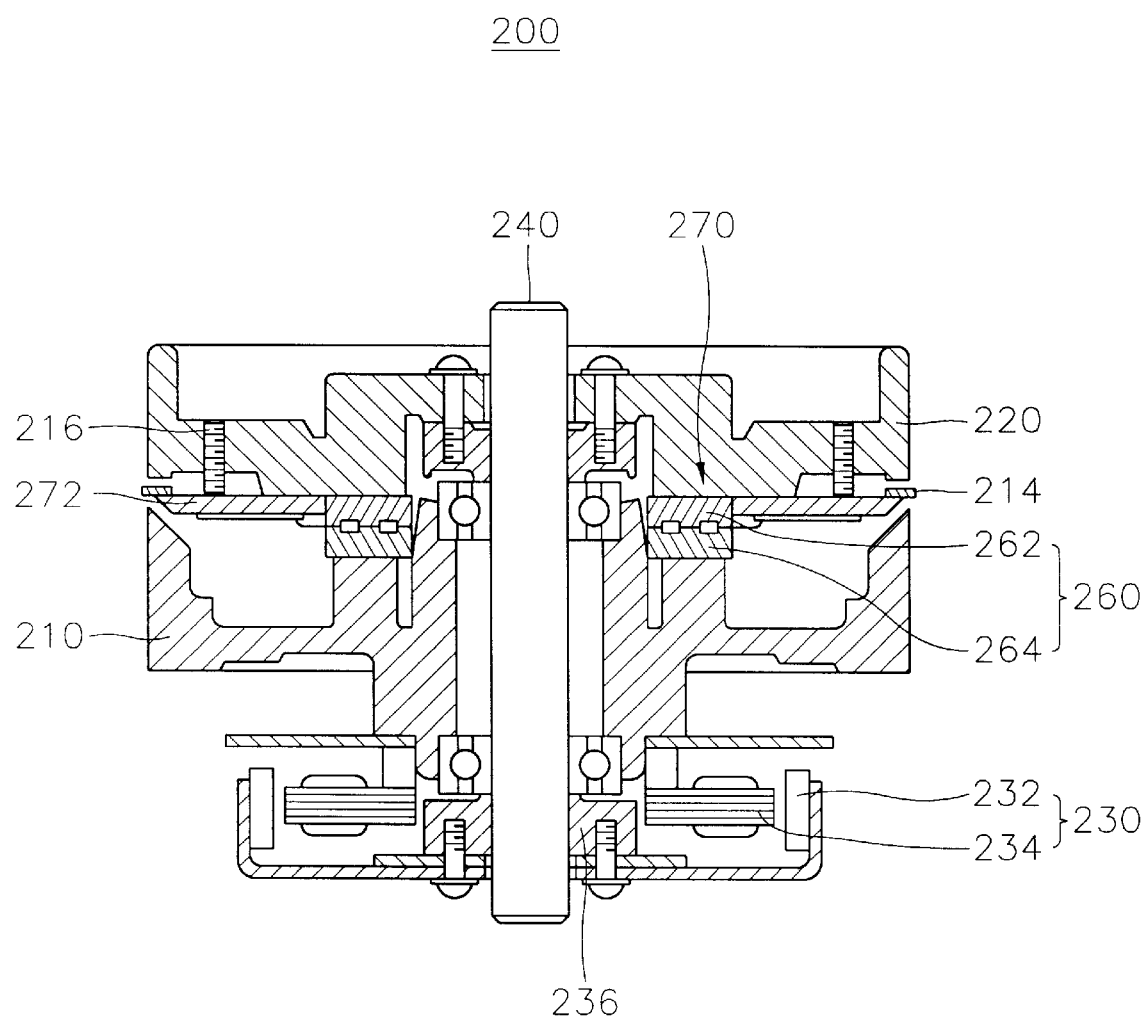
FIG. 2 is a cross-sectional view for showing a head drum assembly of a video cassette recorder in accordance with a first embodiment of the present invention.

FIG. 2 illustrates a head drum assembly 200 of VCR in accordance with tie first embodiment of the present invention. As illustrated in the figure, the head drum assembly 200 includes a lower dram 210 which is fixed on the main base (not shown), an upper drum 220 which is mounted on the lower drum 210, a motor 230 for rotating the upper drum 220, which is positioned at the lower portion of the lower drum 210, and a plurality of the magnetic heads 214 for recording a video signal onto the magnetic tape or for reproducing the video signal from the magnetic tape while the magnetic heads 214 rotate together with the upper drum 220.

The motor 230 is provided with a stator 232 and with a rotor 234 which is rotated by a reciprocal action with the stator 232. The rotor 234 is spaced apart from the stator 232, which is fixed at the motor plange 236. A shaft 240 for rotating the upper drum 220 by transmitting the rotational force of the motor 230 to the upper drum 220 is inserted into the motor plange 236. The upper drum 220 is fixed on the upper surface of the shaft 240. Accordingly, when the rotor 234 of the motor 230 rotates, the upper drum 220 rotates together with the rotor 234 and with the heads 214, which record/reproduce the video signals onto/from the tape.

The heads 214 are electrically connected to the optical device by a rotary transformer 260 which is installed between the upper drum 220 and the lower drum 210. The rotary transformer 260 is fixed at the lower surface of the upper drum 220 by an adhesive and is provided with the rotary transformer rotor 262 which rotates together with the upper drum 220, and with a rotary transformer stator 264 which is fixed on the upper surface of the lower drum 210. The rotary transformer rotor 262 is electrically connected to the heads 214 by an electrical wire (not shown), and the rotary transformer stator 264 is electrically connected to an external device by another electrical wire.

Figure 3:
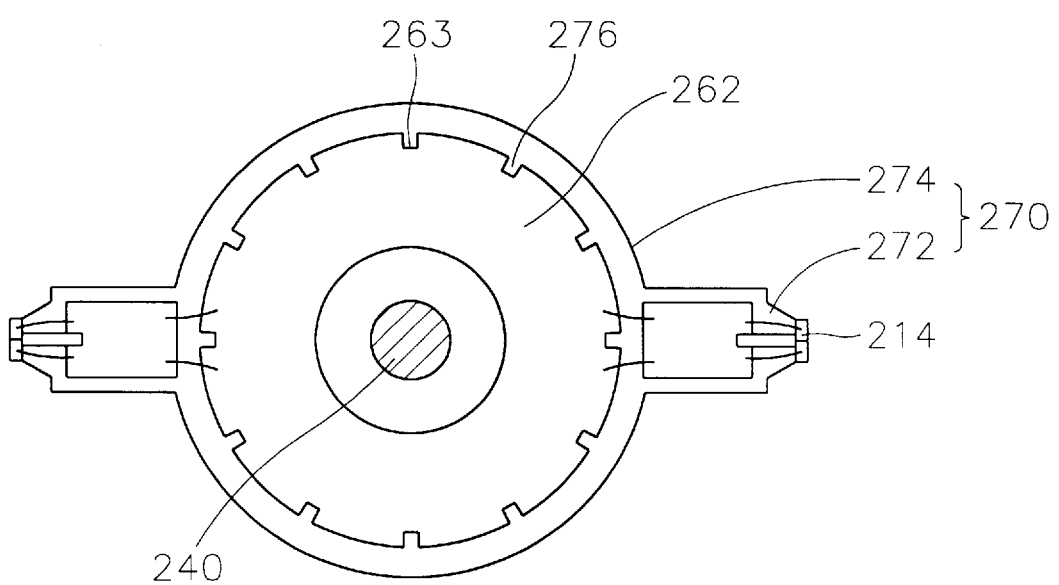
FIG. 3 is a plane view for showing an assembly state of a head base with a rotary transformer rotor of the video cassette recorder shown in FIG. 2.
Figure 4:
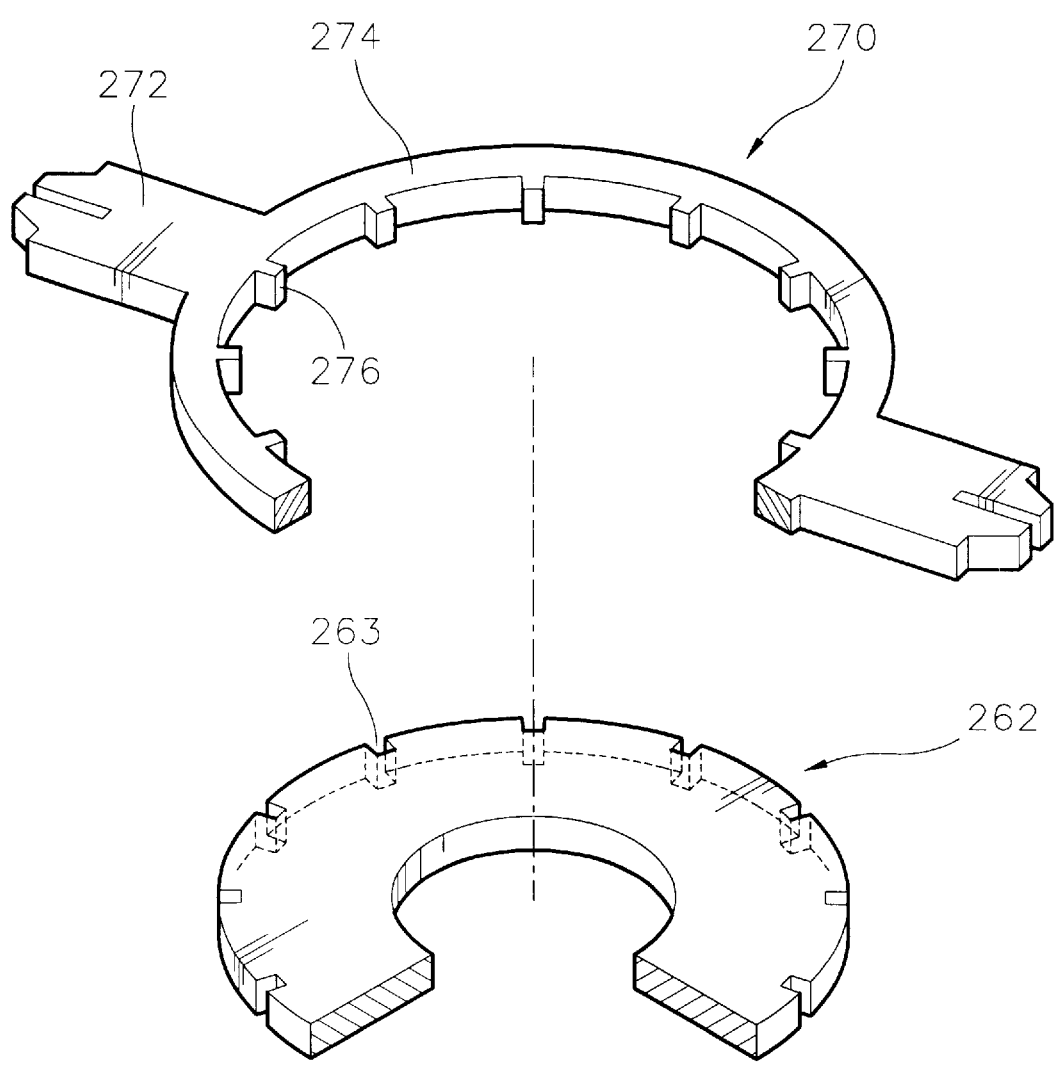
FIG. 4 is an exploded perspective view for illustrating an assembly state of the head base and the rotary transformer rotor shown in FIG. 3.

FIG. 3 is a plane view for showing an assembled state of a head base 272 and a rotary transformer rotor 262 of the video cassette recorder shown in FIG. 2. FIG. 4 is an exploded perspective view for illustrating the head base 272 and the rotary transformer rotor 262 shown in FIG. 3.

As shown in FIG. 3, the rotary transformer rotor 262 is provided with a plurality of first connecting grooves 263 which are formed on the outer circumferencial surface of the rotary transformer rotor 262.

The heads 214 are fixed to a head base part 270. As illustrated in FIG. 4, the head base part 270 is connected to the rotary transformer rotor 262. The head base part 270 is provided with a plurality of the head bases 272 to which the heads 214 are fixed at predetermined intervals, desirably at a predetermined angle, and with a connecting piece 274 which connects the head bases 272 to each other and connects the head bases 272 with the rotary transformer rotor 262.

The connecting piece 274 is preferably comprised of a synthetic resin, and the head base 272 and the connecting piece 274 is integrally formed by a molding method. The connecting piece 274 has an annular shape. The head base 272 is connected by the connecting piece 274 at a predetermined angle on the outer circumferencial surface of tie rotary transformer rotor 262. The connecting piece 274 is provided with a plurality of the first connecting projections 276 which ate formed on the inner circumferencial surface of the connecting piece 274 desirably at the same angle as the first connecting grooves 263. The first connecting projections 276 are inserted into the first connecting grooves 263 of the rotary transformer rotor 262. Accordingly, the connecting piece 274 is integrally formed with the rotary transformer rotor 262. The connecting piece 274 and the rotary transformer rotor 262 are integrally formed by an insert molding method. After the head base part 270 and the rotary transformer rotor 262 are integrally formed, the rotary transformer rotor 262 is fixed at a lower portion of the upper drum 220 by means of an adhesive. At this time, the rotary transformer rotor 262 is fixed at the lower surface of the upper drum 220 so that the heads 214 are placed at the head widows (not shown) of the upper drum 220. The heights of the heads 214 may be controlled by adjusting the fixing screws 216 (shown in FIG. 2).

Hereinafter, the function of the head drum assembly 200 of the video cassette recorder in accordance with the this embodiment will be explained.

When the shaft 240 is rotated by a motor 230, an upper drum 220 which is fixed to the shaft 240, a rotary transformer rotor 262 which is fixed to the upper drum 220, and the head bases 272 which have the heads 214 and are connected to the rotary transformer rotor 262 are rotated by the shaft 240 simultaneously. At this time, the heads 214 record/reproduce the video signals on/from the magnetic tape during the rotation thereof. The rotary transformer 260 transmits the video signals which are reproduced by the heads 214 to an external device, and conversely the rotary transformer 260 transmits the video signals to be recorded onto the magnetic tape from an external device to the heads 214, Embodiment 2

Figure 5:
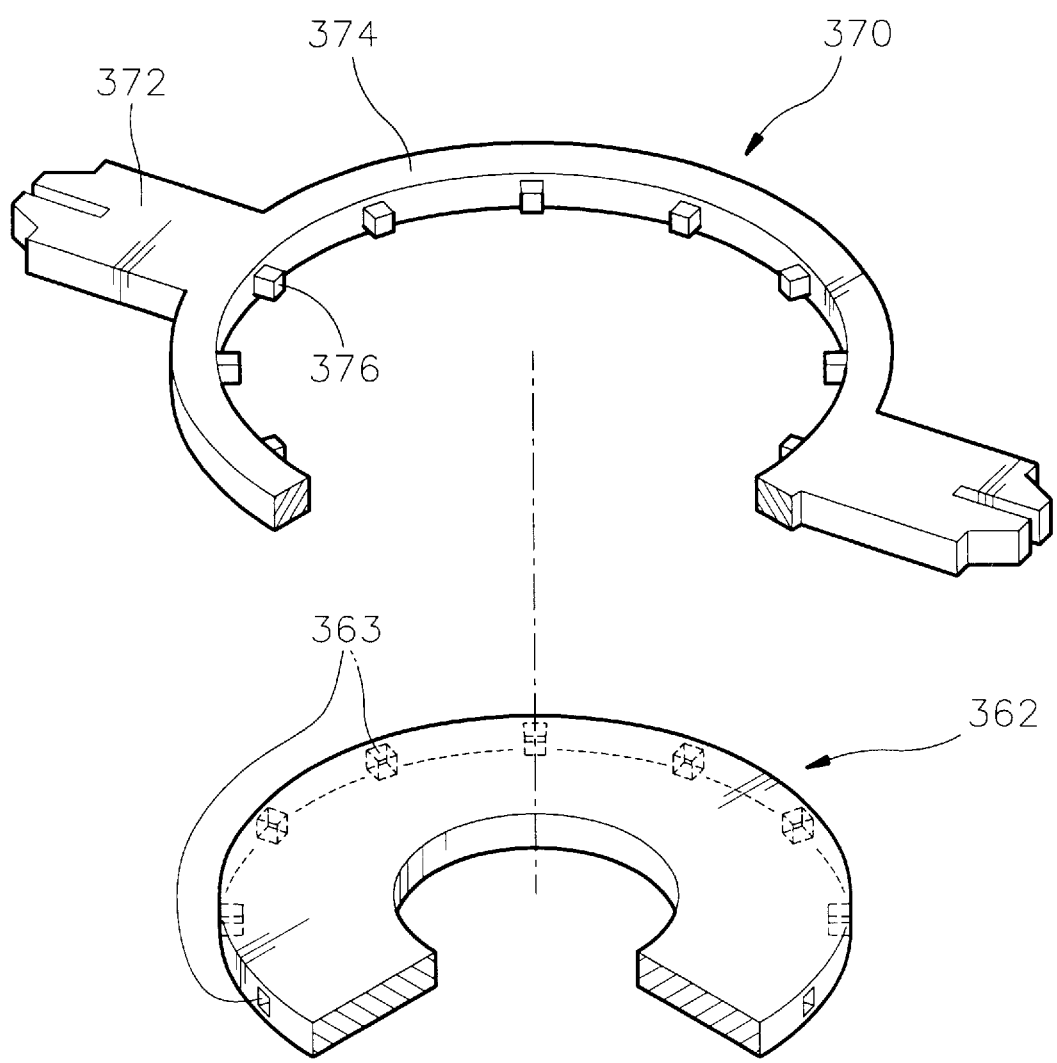
FIG. 5 is an exploded perspective view for explaining an assembly state of the head base and the rotary transformer of a video cassette recorder in accordance with a second embodiment of the present invention.

FIG. 5 illustrate a head drum assembly of the video cassette recorder in accordance with the second embodiment of the present invention.

The head drum assembly in accordance with this embodiment includes a lower drum 210 fixed on the main base (not shown) and an upper drum 220 mounted on the lower drum 210, a motor 230 which rotates the upper dum 220 and is placed at the lower portion of the lower drum 210, and a plurality of the magnetic heads for recording/reproducing video signals onto/from the magnetic tape during their rotation together with the upper drum 220, as shown in FIG. 2.

Since the head drum assembly 300 in accordance with this embodiment is identical to the head drum assembly 200 in accordance with first embodiment except for a rotary transformer rotor 362 and a head base part 370, an explanation with respect to other elements will be omitted in the description of this embodiment.

The heads 214 are electrically connected to the external device by rotary transformer 260 which is installed between the upper drum 220 and the lower drum 210. The rotary transformer 260 is fixed at the lower surface of the upper drum 220 by an adhesive and is provided with the rotary transformer rotor 362 for rotating together with the upper drum 220, and with a rotary transformer stator 264 which is fixed on the upper surface of the lower drum 210. The rotary transformer rotor 362 is electrically connected to the heads 214 by an electrical wire (not shown), and the rotary transformer stator 264 is electrically connected to an external device by another electrical wire. As illustrated in FIG. 5, the rotary transformer rotor 362 is provided with a plurality of second assembly grooves 363 which are formed in the radial direction on the outer circumferencial surface of the rotary transformer rotor 365.

The heads 214 are fixed to the head base part 370. As illustrated in FIG. 5, the head bases 372 are connected to the rotary transformer rotor 362. The head base part 370 is provided with a plurality of the head bases 372 having the heads 214, which are spaced apart from each other by a predetermined interval, and desirably fixed at a predetermined angle, and with a connecting piece 374 which connects the head bases 372 to each other and is connected to the rotary transformer rotor 362.

The connecting piece 374 is preferably comprised of a synthetic resin. The head bases 372 and the connecting piece 374 are integrally formed by a molding method. The connecting piece 374 has an annular shape, and the head bases 372 are connected by the connecting piece 374 at a predetermined angle on the outer circumferencial surface of the rotary transformer rotor 362. The connecting piece 374 is provided with a plurality of second connecting projections 376 which are formed in the radial direction at the inner circumferencial surface of the connecting piece 370, desirably at the same angle as second connecting grooves 363. The second connecting grooves 363 are inserted into the second connecting grooves 363 of the rotary transformer rotor 362. Accordingly, the connecting piece 374 is integrally formed with the rotary transformer rotor 362. The connecting piece 374 and the rotary transformer rotor 362 are integrally formed by an insert molding method. After the head base part 370 and the rotary transformer rotor 362 are integrally formed, the rotary transformer rotor 362 is fixed at the lower portion of the upper drum 220 by means of an adhesive. At this time, the rotary transformer rotor 362 is fixed to the lower surface of the upper drum 220 so that the heads 214 are placed at the head windows (not shown). The heights of the heads 214 are controlled by adjusting the fixing screws 216 (refer to FIG. 2.).

Hereinafter, the function of the head drum assembly of the video cassette recorder in accordance with the second embodiment will be explained.

When the shaft 240 is being rotated by the motor 230, the upper drum 220 which is fired at the shaft 240, the rotary transformer rotor 362 which is fixed at the upper drum 220, and the head bases 372 having the heads 214 and being connected with tho rotary transformer rotor 362 are rotated by the shaft 240 simultaneously. At this time, the heads record or reproduce the video signals onto or from the magnetic tape during their rotation according to the operating modes of the VCR. The rotary transformer transmits the video signals which are reproduced by the heads 214 to an external device, and conversely the rotary transformer transmits the video signals to be recorded on the magnetic tape from an external device to the bead bases 372.

As described through the embodiments, the head drum assembly of the video cassette recorder in accordance with the present invention has the advantages that the assembling thereof is easy, productivity is increased, and the manufacturing cost thereof is reduced.

As described above, although illustrative embodiments of the present invention have been described in detail herein, it is to be understood that the invention is not limited to those precise embodiments, and that various changes and modifications may be effected therein by one skilled in the art without departing from the scope or spirit of the invention.

What is claimed is:

1. A head drum assembly of a video cassette recorder, the head drum assembly comprising:

a lower drum;

an upper drum which is mounted on the lower drum;

a motor for generating a rotational force to rotate the upper drum and having a stator which is mounted at a lower surface of the lower drum, and a rotating rotor which is spaced apart from the stator by a predetermined interval and is rotated when an electrical signal is applied to the stator;

a shaft for transmitting the rotational force of the motor to the upper drum;

a plurality of magnetic heads for recording video signals onto a magnetic tape or for reproducing the video signals from the magnetic tape according to operating modes of the video cassette recorder;

a rotary transformer having a rotary transformer stator fixed on the lower drum, and a rotary transformer rotor disposed above the rotary transformer stator for transmitting a signal generated from the plurality of magnetic heads to the rotary transformer stator; and a head base assembly including a plurality of head bases which are spaced from each other by a predetermined interval and on which the magnetic heads are mounted, and an annular shaped connecting piece for connecting the head bases to each other, the rotary transformer rotor being disposed within the annular shaped connecting piece and the rotary transformer rotor, the head bases and the annular connecting piece being integrally formed with each other.

2. The head drum assembly of the video cassette recorder as claimed in claim 1, wherein said rotary transformer rotor has connecting grooves which are separated from each other by a predetermined distance and are formed on an outer circumferencial surface of said rotary transformer rotor, and the annular shaped connecting piece has a plurality of connecting projections which are separated from each other by the predetermined distance and are formed on an inner circumferencial surface of the annular shaped connecting piece so as to be inserted into the connecting grooves of the rotary transformer rotor.

3. The head drum assembly of the video cassette recorder as claimed in claim 1, wherein said rotary transformer rotor has a plurality of connecting grooves which are separated by a predetermined angle and are formed on an outer circumferencial surface of said rotary transformer rotor, and the annular shaped connecting piece is provided at an inner circumferencial surface thereof with a plurality of connecting projections which are separated from each other by the predetermined angle and extend in a radially inward direction of the connecting piece so as to be inserted into the connecting grooves of the rotary transformer rotor.

4. The head drum assembly of the video cassette recorder as claimed in claim 1, wherein said rotary transformer rotor and said head base assembly are integrally insert-molded with each other.

5. The head drum assembly of the video cassette recorder as claimed in claim 1, wherein said head bases are made of a synthetic resin.

* * * * *